(12) United States Patent
Fischer et al.

(10) Patent No.: US 11,174,921 B2
(45) Date of Patent: Nov. 16, 2021

(54) V TENSIONER AND ENDLESS DRIVE ARRANGEMENT

(71) Applicant: LITENS AUTOMOTIVE PARTNERSHIP, Woodbridge (CA)

(72) Inventors: Michael B. Fischer, Fellan (DE); Wei Ma, Richmond Hill (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 265 days.

(21) Appl. No.: 16/333,199

(22) PCT Filed: Sep. 13, 2017

(86) PCT No.: PCT/CA2017/051078
§ 371 (c)(1),
(2) Date: Mar. 13, 2019

(87) PCT Pub. No.: WO2018/049521
PCT Pub. Date: Mar. 22, 2018

(65) Prior Publication Data
US 2019/0242463 A1     Aug. 8, 2019

Related U.S. Application Data

(60) Provisional application No. 62/394,081, filed on Sep. 13, 2016.

(51) Int. Cl.
*F16H 7/12* (2006.01)
*B60K 25/02* (2006.01)
(Continued)

(52) U.S. Cl.
CPC ............... *F16H 7/12* (2013.01); *B60K 25/02* (2013.01); *F02B 67/06* (2013.01); *F16F 7/04* (2013.01);
(Continued)

(58) Field of Classification Search
CPC ........... F16H 2007/0874; F16H 7/1281; F16H 7/1218; F16H 2007/0893; F16H 7/0829; F16H 2007/081
(Continued)

(56) References Cited

U.S. PATENT DOCUMENTS 613,960 A  *  11/1898  Bigelow ....................... 474/109
1,707,119 A       3/1929   Good
(Continued)

FOREIGN PATENT DOCUMENTS

DE     4025936 A1    12/1992
DE     1243451 A1     6/1994
(Continued)

OTHER PUBLICATIONS

Extended European Search Report for EP13860580.
(Continued)

*Primary Examiner* — Henry Y Liu
(74) *Attorney, Agent, or Firm* — Millman IP Inc.

(57) ABSTRACT

In an aspect, a V tensioner is provided and includes a first arm and a second arm. A damping structure and a damping system biasing member are provided. The damping system biasing member is positioned axially in between the first and second arms.

13 Claims, 13 Drawing Sheets

(51) Int. Cl.
*F16H 7/20* (2006.01)
*F16H 9/26* (2006.01)
*F02B 67/06* (2006.01)
*F16F 7/04* (2006.01)

(52) U.S. Cl.
CPC ............ *F16H 7/20* (2013.01); *F16H 9/26* (2013.01); *B60K 2025/022* (2013.01)

(58) Field of Classification Search
USPC ........................................................ 474/134
See application file for complete search history.

(56) References Cited

U.S. PATENT DOCUMENTS

| | | | | |
|---|---|---|---|---|
| 1,971,551 | A * | 8/1934 | Curtiss | F16H 7/1281 |
| | | | | 474/137 |
| 3,811,332 | A * | 5/1974 | Brown | F16H 7/08 |
| | | | | 474/111 |
| 4,473,362 | A * | 9/1984 | Thomey | F02B 67/06 |
| | | | | 267/136 |
| 4,504,254 | A * | 3/1985 | Foster | F16H 7/1245 |
| | | | | 29/452 |
| 4,698,049 | A * | 10/1987 | Bytzek | F16H 7/1218 |
| | | | | 384/271 |
| 4,758,208 | A * | 7/1988 | Bartos | F16H 7/1281 |
| | | | | 474/135 |
| 4,902,267 | A * | 2/1990 | Henderson | F16H 7/1218 |
| | | | | 474/133 |
| 4,934,989 | A | 6/1990 | Furukawa et al. | |
| 6,165,091 | A * | 12/2000 | Dinca | F16F 9/145 |
| | | | | 474/101 |
| 6,506,137 | B2 * | 1/2003 | Guhr | F02B 67/06 |
| | | | | 474/134 |
| 6,648,783 | B1 * | 11/2003 | Bogner | F16H 7/1281 |
| | | | | 474/134 |
| 6,736,743 | B2 * | 5/2004 | Fletcher | F16H 7/24 |
| | | | | 254/100 |
| 6,830,524 | B2 * | 12/2004 | Tamai | F16H 7/1281 |
| | | | | 474/111 |
| 6,857,978 | B2 * | 2/2005 | Polster | F16H 7/1209 |
| | | | | 474/134 |
| 6,857,979 | B2 * | 2/2005 | Macnaughton | F16H 7/1218 |
| | | | | 474/101 |
| 6,960,145 | B2 * | 11/2005 | Fraley, Jr. | B62D 5/0424 |
| | | | | 180/444 |
| 7,273,432 | B2 * | 9/2007 | Schonmeier | F16H 7/1218 |
| | | | | 474/112 |
| 7,367,908 | B2 | 5/2008 | Lemberger et al. | |
| 8,038,555 | B2 * | 10/2011 | Pendergrass | F16H 7/1218 |
| | | | | 474/135 |
| 8,057,334 | B2 * | 11/2011 | Kotzur | F02B 67/06 |
| | | | | 474/133 |
| 8,075,433 | B2 * | 12/2011 | Quintus | F16H 7/1218 |
| | | | | 474/135 |
| 8,142,314 | B2 * | 3/2012 | Antchak | F16H 7/1218 |
| | | | | 474/135 |
| 8,142,315 | B2 * | 3/2012 | Dell | F16H 7/1281 |
| | | | | 474/135 |
| 8,353,795 | B2 | 1/2013 | Montani et al. | |
| 8,439,780 | B2 * | 5/2013 | Ruffini | F16H 7/1281 |
| | | | | 474/112 |
| 8,821,328 | B2 * | 9/2014 | Jud | F16H 7/1281 |
| | | | | 474/134 |
| 2002/0039944 | A1 * | 4/2002 | Ali | F16H 7/1218 |
| | | | | 474/135 |
| 2002/0086751 | A1 * | 7/2002 | Bogner | F02B 67/06 |
| | | | | 474/134 |
| 2003/0109342 | A1 * | 6/2003 | Oliver | F16H 7/1281 |
| | | | | 474/134 |
| 2003/0153421 | A1 * | 8/2003 | Liu | F16H 7/1209 |
| | | | | 474/134 |
| 2003/0216203 | A1 * | 11/2003 | Oliver | F16H 7/1281 |
| | | | | 474/134 |
| 2004/0171448 | A1 * | 9/2004 | Lemberger | F16H 7/1218 |
| | | | | 474/135 |
| 2004/0180745 | A1 * | 9/2004 | Dinca | F16H 7/1281 |
| | | | | 474/135 |
| 2005/0181901 | A1 * | 8/2005 | Shin | F16H 7/1218 |
| | | | | 474/134 |
| 2006/0035738 | A1 | 2/2006 | Bogner et al. | |
| 2006/0063626 | A1 | 3/2006 | Kelm et al. | |
| 2006/0073926 | A1 | 4/2006 | Kelm et al. | |
| 2006/0217222 | A1 * | 9/2006 | Lolli | F02B 67/06 |
| | | | | 474/134 |
| 2006/0287146 | A1 * | 12/2006 | McVicar | F16H 7/1281 |
| | | | | 474/109 |
| 2007/0006836 | A1 | 1/2007 | Pflug et al. | |
| 2007/0010362 | A1 | 1/2007 | Bogner et al. | |
| 2007/0037648 | A1 * | 2/2007 | Di Giacomo | F02B 67/06 |
| | | | | 474/134 |
| 2007/0161444 | A1 * | 7/2007 | Hartmann | F16H 7/1272 |
| | | | | 474/133 |
| 2007/0163529 | A1 | 7/2007 | Hartmann et al. | |
| 2007/0173361 | A1 | 7/2007 | Schuseil | |
| 2008/0214342 | A1 * | 9/2008 | Montani | F02B 67/06 |
| | | | | 474/134 |
| 2008/0280713 | A1 * | 11/2008 | Fischer | F16H 7/1281 |
| | | | | 474/135 |
| 2009/0298631 | A1 * | 12/2009 | Jud | F02B 67/06 |
| | | | | 474/237 |
| 2010/0331127 | A1 * | 12/2010 | Dec | F16H 7/1218 |
| | | | | 474/135 |
| 2013/0260932 | A1 * | 10/2013 | Adam | F16H 7/1218 |
| | | | | 474/134 |
| 2016/0273622 | A1 * | 9/2016 | Kim | F02N 11/00 |

FOREIGN PATENT DOCUMENTS

| | | |
|---|---|---|
| DE | 19849469 A1 | 5/2000 |
| DE | 19849659 A1 | 5/2000 |
| DE | 19849886 A1 | 5/2000 |
| DE | 19524403 C2 | 9/2000 |
| DE | 19926612 A1 | 12/2000 |
| DE | 19926613 A1 | 12/2000 |
| DE | 19926615 A1 | 12/2000 |
| DE | 19926647 A1 | 12/2000 |
| DE | 10000970 A1 | 9/2001 |
| DE | 10045143 | 2/2002 |
| DE | 10120448 A1 | 10/2002 |
| DE | 20023355 U1 | 12/2003 |
| DE | 10253450 A1 | 5/2004 |
| DE | 10321801 A1 | 7/2004 |
| DE | 102004025936 A1 | 12/2005 |
| DE | 4040579 A1 | 2/2006 |
| DE | 102004048629 A1 | 4/2006 |
| DE | 102004058772 A1 | 7/2006 |
| DE | 102004060015 A1 | 7/2006 |
| DE | 102006014942 A1 | 10/2007 |
| DE | 102007042501 A1 | 3/2009 |
| DE | 10200814325 A1 | 9/2009 |
| DE | 102008014325 A1 | 9/2009 |
| DE | 102008025552 A1 | 12/2009 |
| DE | 102010019613 A1 | 11/2011 |
| EP | 757190 A1 | 5/1997 |
| EP | 1303712 A1 | 4/2003 |
| EP | 1955320 A1 | 4/2003 |
| EP | 1122464 A1 | 3/2004 |
| EP | 1437528 A2 | 7/2004 |
| EP | 1464871 A1 | 10/2004 |
| EP | 1420192 B2 | 2/2007 |
| EP | 1322874 B1 | 1/2008 |
| EP | 2128489 B1 | 5/2009 |
| EP | 1420191 B1 | 4/2013 |
| EP | 2385272 B1 | 1/2014 |
| JP | 9144821 A | 6/1997 |
| JP | 11-190223 A | 7/1999 |
| JP | 1999-190222 | 7/1999 |
| JP | 2001-59555 | 3/2001 |
| JP | 2001-107827 B2 | 4/2001 |

(56) References Cited

FOREIGN PATENT DOCUMENTS

| | | |
|---|---|---|
| JP | 2001-193807 | 7/2001 |
| JP | 2004-68973 A | 3/2004 |
| JP | 2004-84772 A | 3/2004 |
| JP | 2006200639 A | 8/2006 |
| WO | 2002010615 A1 | 2/2002 |
| WO | 2002029279 A2 | 4/2002 |
| WO | 2004059192 A1 | 7/2004 |
| WO | 2004088171 A1 | 10/2004 |
| WO | 2005012765 A1 | 2/2005 |
| WO | 2005038297 A1 | 4/2005 |
| WO | 2005100820 A1 | 10/2005 |
| WO | 2005100825 A1 | 10/2005 |
| WO | 2005106286 A1 | 11/2005 |
| WO | 2005106287 A1 | 11/2005 |
| WO | 2005114005 A1 | 12/2005 |
| WO | 2005116486 A1 | 12/2005 |
| WO | 2005119087 A1 | 12/2005 |
| WO | 2005119088 A1 | 12/2005 |
| WO | 2005119090 A1 | 12/2005 |
| WO | 2005121601 A1 | 12/2005 |
| WO | 2005121603 A1 | 12/2005 |
| WO | 2006000278 A1 | 1/2006 |
| WO | 2006002709 A1 | 1/2006 |
| WO | 2006005411 A1 | 1/2006 |
| WO | 2006005421 A1 | 1/2006 |
| WO | 2006005430 A1 | 1/2006 |
| WO | 2006012955 A1 | 2/2006 |
| WO | 2006018095 A1 | 2/2006 |
| WO | 2006021279 A1 | 3/2006 |
| WO | 2006032350 A1 | 3/2006 |
| WO | 2006037426 A1 | 4/2006 |
| WO | 2006037427 A1 | 4/2006 |
| WO | 2006037466 A1 | 4/2006 |
| WO | 2006099731 A1 | 9/2006 |
| WO | 2006061180 A2 | 11/2006 |
| WO | 2007025374 A3 | 4/2007 |
| WO | 2007059817 A1 | 5/2007 |
| WO | 2007088167 A1 | 8/2007 |
| WO | 2007106971 A1 | 9/2007 |
| WO | 2007118625 A1 | 10/2007 |
| WO | 2010037232 A1 | 4/2010 |
| WO | 2012049030 A1 | 4/2012 |
| WO | 2013142951 A1 | 10/2013 |
| WO | 2014085917 A1 | 6/2014 |
| WO | 2016061685 A1 | 4/2016 |
| WO | 2016126428 A1 | 8/2016 |

OTHER PUBLICATIONS

Communication for EP12872747.6 dated Jan. 3, 2019.
Cellasto Components Complete Industrial Products Brochure (CCF).
Elastogran—Innovations in Cellasto (Damping Applications) (Brochure).
International Search Report and Written Opinion for PCT/CA2012/001033.
The Belt-Driven Starter Generator as Current Challenge fora Function-Optimized Belt Drive System Development.
The Belt-Driven Starter Generator (RSG): An Innovative Funktionserweiter of the Ancillaries Drive.
BASF Elastogran CCF Foam—Material Properties Jul. 2011.
BASF Elastogran Closed Cell Foam Spring—Applications.
BASF Elastogran CCF Foam—Vehicle Vib Damping Apps—Jul. 2011.
Extended Search Report for EP11002362 (EPO).
International Search Report and Written Opinion of PCT/CA2017/051078.
Office Action for JP 2019-513909 dated Jun. 3, 2021.

\* cited by examiner

V TENSIONER AND ENDLESS DRIVE ARRANGEMENT

CROSS-REFERENCE TO RELATED APPLICATIONS

This application claims priority to and the benefit of U.S. Provisional Patent Application No. 62/394,081 filed Sep. 13, 2017, the contents of which are incorporated herein in their entirety.

FIELD OF THE DISCLOSURE

This disclosure relates generally to the field of tensioners for an endless drive arrangement, and more particularly to a belt drive arrangement for an engine having a starter-generator unit, wherein the belt drive arrangement includes a V tensioner.

BACKGROUND OF THE DISCLOSURE

An ever increasing number of engines having a starter-generator unit have been developed since the 1990s in order to improve fuel mileage. In such engines, the combustion process is stopped when the vehicle comes to rest, for example, at a stoplight. In this condition the starter-generator unit is operated as a starter motor to restart the engine. Once the engine is started, the starter-generator unit can be selectively operated as a generator to recharge the batteries.

The starter-generator unit is mechanically connected to the engine via an endless drive such as a belt or chain. The endless drive member is subject to tension fluctuations, particularly as the starter-generator unit shifts its function between starter and generator, in which case the tight side and slack side of the endless drive reverses. The endless drive tensioning system must handle this and other tension fluctuations that occur whilst the engine is operating.

Various dual arm tensioners are known in the art, example of which are found in publication numbers DE 102 53 450 A1; EP 1 464 871 A1; US 2004/0171448 A1; EP 1 122 464 A1; and DE 42 43 451 A1. However, a tensioner disclosed herein seeks to provide a more robust solution to extend the operating life of such tensioners.

SUMMARY OF THE DISCLOSURE

In an aspect, a tensioner for tensioning an endless drive member is provided, comprising a base having a proximal end and a distal end and which is mountable at the proximal end to a stationary structure. The tensioner further includes a first tensioner arm that is pivotable relative to the base about a common axis, and a first tensioner pulley that is mounted for rotation on the first tensioner arm about a first pulley axis that is spaced from the common axis. The tensioner further includes a second tensioner arm that is pivotable relative to the base about the common axis, and a second tensioner pulley that is mounted for rotation on the second tensioner arm about a second pulley axis that is spaced from the common axis and spaced from the first pulley axis. The tensioner further includes a tensioner biasing member that is engaged between the first and second tensioner arms to urge the first and second tensioner pulleys towards each other. The tensioner further includes a first tensioner arm damping arrangement including a first radial damping portion positioned radially between the first tensioner arm and the base, and a first axial damping portion. The first radial damping portion and the first axial damping portion cooperate to provide damping to movement of the first tensioner arm. The tensioner further includes a second tensioner arm damping arrangement including a second radial damping portion positioned radially between the second tensioner arm and the base and a second axial damping portion. The second radial damping portion and the second axial damping portion cooperate to provide damping to movement of the second tensioner arm. The tensioner further includes a damping system biasing member that is engaged between the first and second tensioner arms and that exerts first and second damping system biasing forces on the first and second axial damping portions respectively. The first and second damping system biasing forces are directed in axially opposite directions from one another.

In another aspect, a tensioner for tensioning an endless drive member is provided, comprising a base having a proximal end and a distal end and which is mountable at the proximal end to a stationary structure. The tensioner further includes a first tensioner arm that is pivotable relative to the base about a common axis, and a first tensioner pulley that is mounted for rotation on the first tensioner arm about a first pulley axis that is spaced from the common axis. The tensioner further includes a second tensioner arm that is pivotable relative to the base about the common axis, and a second tensioner pulley that is mounted for rotation on the second tensioner arm about a second pulley axis that is spaced from the common axis and spaced from the first pulley axis. The tensioner further includes a tensioner biasing member that is engaged between the first and second tensioner arms to urge the first and second tensioner pulleys towards each other. The tensioner further includes a first tensioner arm damping arrangement including a first radial damping portion positioned radially between the first tensioner arm and the base, and a first axial damping portion. The first radial damping portion and the first axial damping portion cooperate to provide damping to movement of the first tensioner arm. The tensioner further includes a second tensioner arm damping arrangement including a second radial damping portion positioned radially between the second tensioner arm and the base and a second axial damping portion. The second radial damping portion and the second axial damping portion cooperate to provide damping to movement of the second tensioner arm. The tensioner further includes a damping system biasing member that is positioned to apply an axial biasing force to the first and second axial damping portions to generate friction thereat. The first tensioner arm damping arrangement and the second tensioner arm damping arrangement together include a first arm tophat member, a second arm tophat member, and an intermediate tophat member, wherein the first arm tophat member, the second arm tophat member and the intermediate tophat member each include a cylinder that surrounds the base, and a flange. The flange of the first arm tophat member cooperates with a proximal surface on the first tensioner arm to dampen movement thereof. The flange of the second arm tophat member cooperates with a distal surface on the second tensioner arm to dampen movement thereof. The flange of the intermediate tophat member is positioned to cooperate with a distal surface on the first tensioner arm and a proximal surface on the second tensioner arm to dampen movement of either of the first and second tensioner arms relative to the other of the first and second tensioner arms.

BRIEF DESCRIPTION OF THE DRAWINGS

The foregoing and other aspects will be more readily appreciated having regard to the accompanying drawings, wherein.

DETAILED DESCRIPTION

Figure 1:
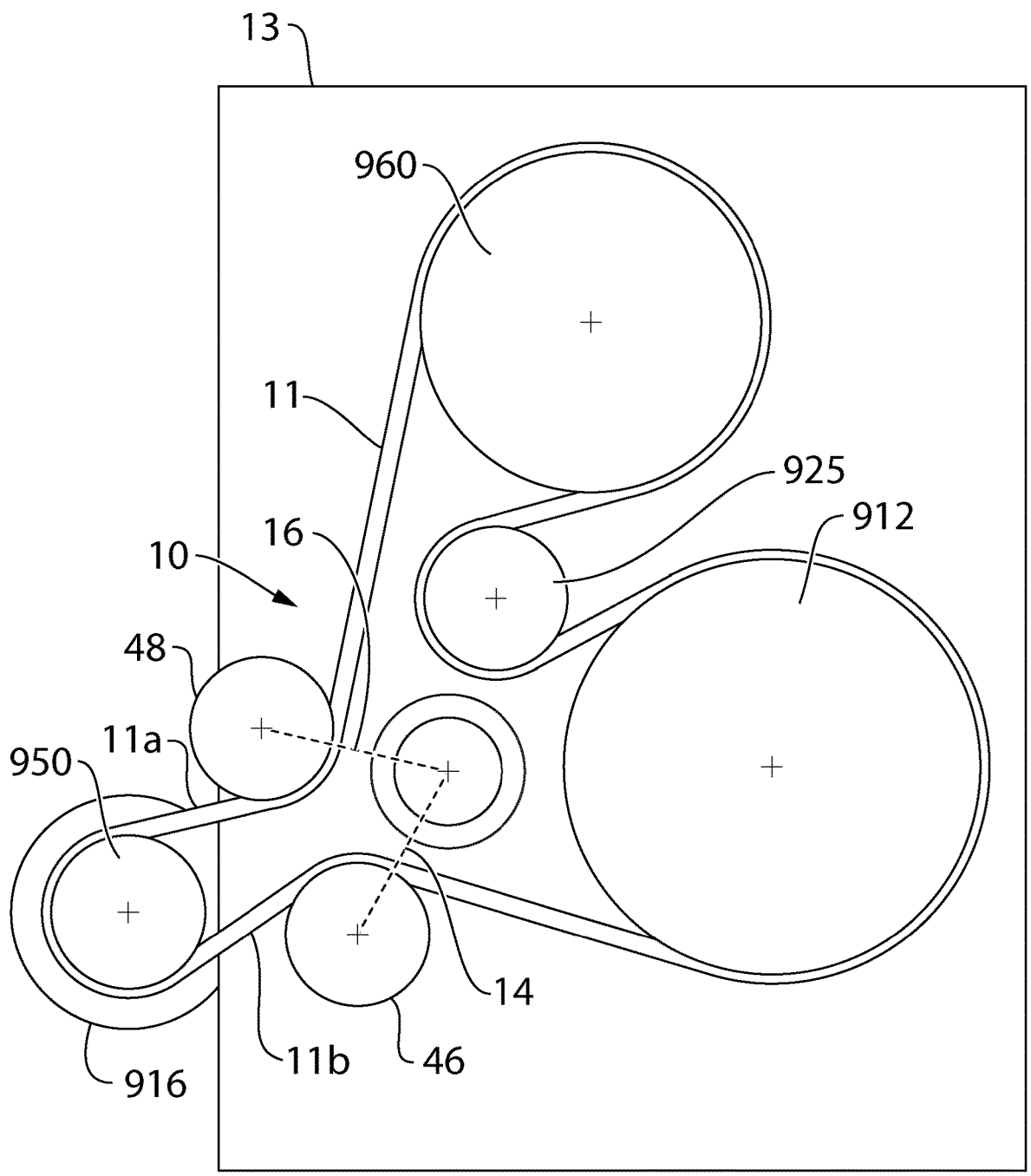
FIG. 1 is a plan view of an endless drive arrangement which incorporates a tensioner.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Figure 2:
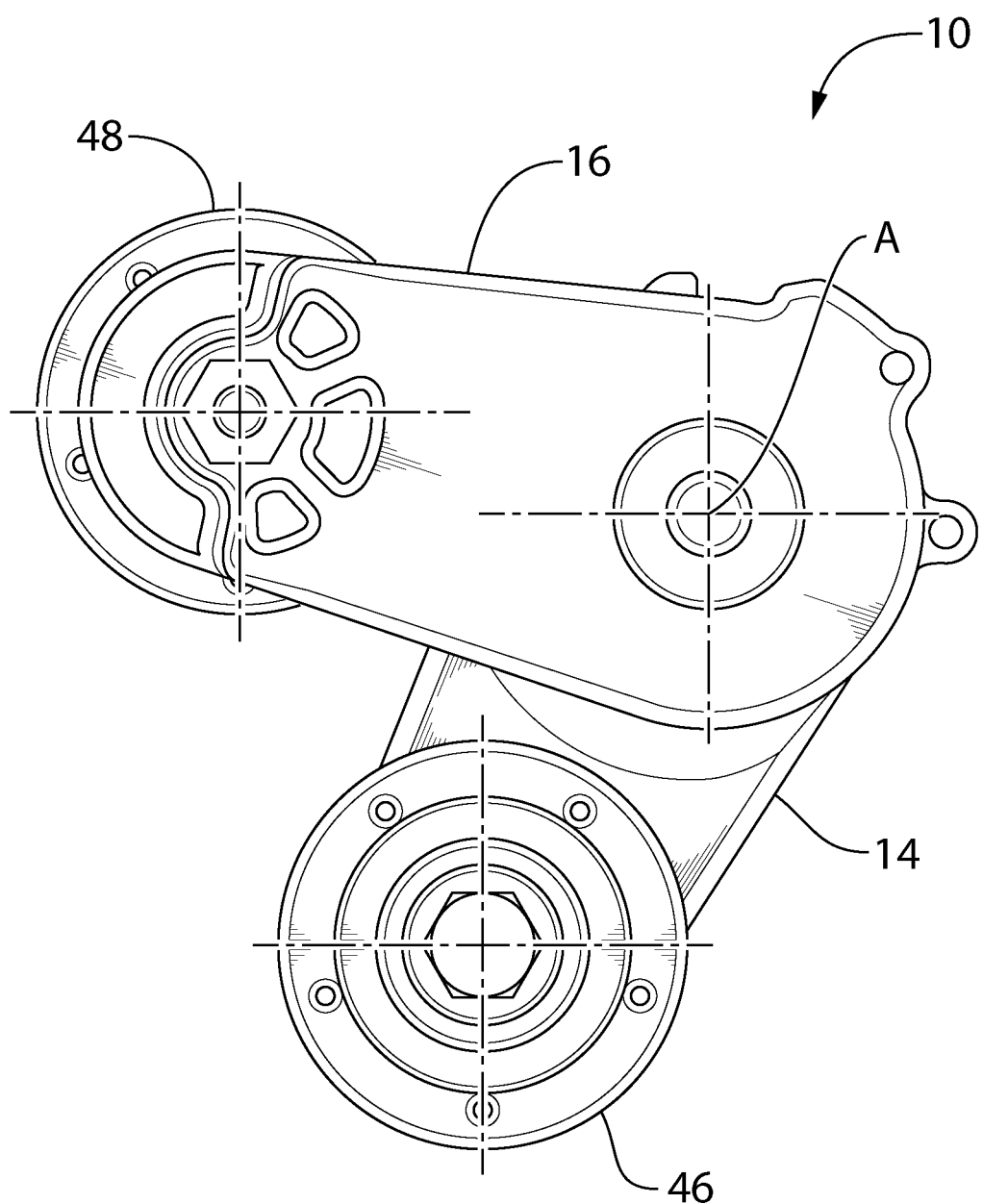
FIG. 2 is a top view of the tensioner shown in FIG. 1, having first and second tensioner arms.

FIG. 2 is a top view of an embodiment of a tensioner 10 usable for tensioning an endless drive member 11 (FIG. 1). The endless drive member 11 may be for use on an engine 13 for a vehicle (not shown) and may be connected to a crankshaft pulley 912, a water pump pulley 960, a motor/generator unit pulley 950 for a motor/generator unit 916 (also referred to as an MGU 916), and an idler 925. The MGU 916 may be used for a number of purposes, including, for example, driving accessories such as the water pump or an air conditioning compressor (not shown) via the endless drive member 11 when the engine 13 is off temporarily, (e.g. when the vehicle is at a stoplight and the engine 13 is turned off to conserve fuel as occurs automatically in some hybrid vehicles). The MGU 916 could be used to provide a BAS drive capability to the engine 13 so that the engine 13 may be started by the MGU 916 through the endless drive member 11.

The endless drive member 11 may be a belt, or alternatively, it may be any other suitable type of endless drive member. In instances where the endless drive member 11 is a belt, it may be any suitable type of belt, such as a flat belt, a V belt, a poly-V belt, a timing belt.

Figure 3:
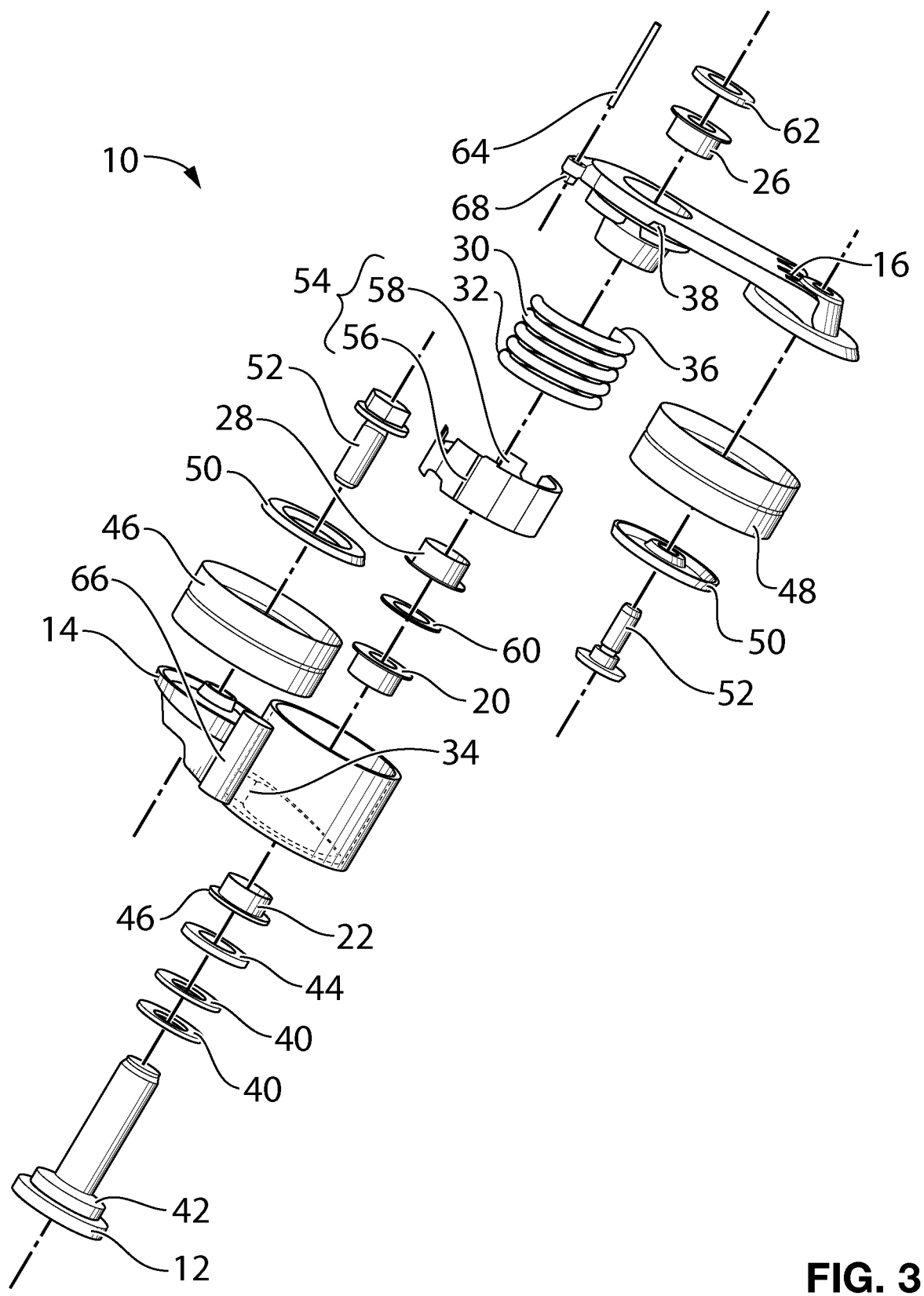
FIG. 3 is an exploded perspective view of the tensioner shown in FIG. 1.
Figure 4:
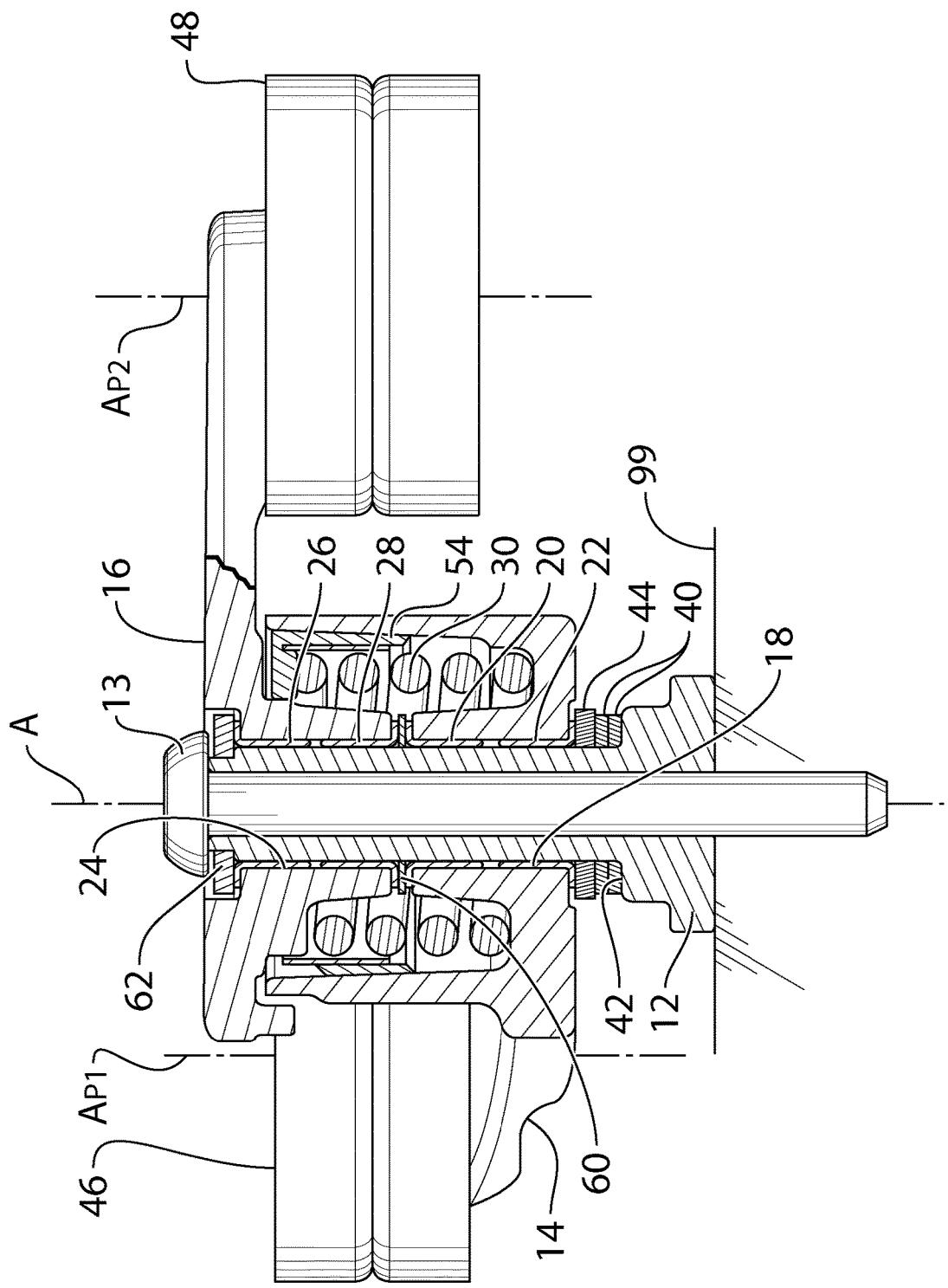
FIG. 4 is a sectional side view of the tensioner shown in FIG. 1.

Referring to FIGS. 3 and 4, the tensioner 10 includes a base 12 that is mountable to a stationary structure 99 such as an engine block. The base 12 may be in the form of a hollow shaft that defines a tensioner arm pivot axis A that has a mounting fastener (e.g. a threaded fastener) 13 that passes therethrough and that mounts into a mounting aperture (e.g. a threaded aperture) in the stationary structure 99. The tensioner 10 further includes a first tensioning arm 14 (which may be referred to as a lower tensioner arm) and a second tensioning arm 16 (which may be referred to as an upper tensioner arm). The first tensioning arm 14 is pivotably mounted to the base 12. In the example, shown the first tensioner arm 14 has a pass-through aperture 18 for mounting to the base 12. A first bushing arrangement that, in this example includes first and second lower bushings 20 and 22, extends in a radial space between the first arm aperture 18 and the outer surface of the base 12 to protect against metal-to-metal contact between the base 12 and the first arm 14. The bushings 20 and 22 may be made from any suitable material such as polyamide 4.6 or 6.6. The bushings 20 and 22 are shown to be spaced apart axially. It is alternatively possible for the bushings 20 and 22 to not be spaced apart axially. Furthermore, it is possible for the first bushing arrangement to comprise a different number of bushings, such as, for example, a single bushing.

The second tensioner arm 16 also includes a pass-through aperture 24 for pivotably mounting the second arm 16 to the base 12. A second bushing arrangement which may be similar to the first bushing arrangement (and which in this example includes first and second upper bushings 26 and 28), may be provided in the radial space between the aperture 24 and the outer surface of the base 12.

A tensioner arm biasing member 30 is provided and has a first end 32 that is engaged with a drive face 34 on the first tensioner arm 14 and a second end 36 that is engaged with a second drive face 38 on the second tensioner arm 16 so as to bias the first and second arms in respective first and second free arm directions into the belt 11. The free arm direction is the direction that the tensioner arm 14 or 16 would be moved in by the biasing member 30 if there were no belt present to resist the arm's movement. By contrast, the load stop direction is the direction the arm 16 would be moved in in if the belt tension were sufficiently high to overcome the biasing force of the biasing member 30. In general the free arm direction for a tensioner arm is a direction of movement that bring the tensioner arm into the belt, and the load stop direction is a direction of movement that brings the tensioner arm away from the belt. The tensioner arm biasing member 30 may be any suitable type of biasing member such as, for example, a torsion spring.

Each of the tensioner arms 14 and 16 has a pulley (shown at 46 and 48 respectively) rotationally mounted thereto for rotation about a pulley axis AP1 and AP2 respectively. Each pulley 46, 48 has a dust shield 50 that assists in protecting the bearing in the pulley from dust and debris. A mounting fastener (e.g. a threaded fastener) 52 is used to mount the pulley 46, 48 to the respective tensioner arm 14, 16.

As shown in FIG. 1, each pulley 46, 48 is engaged with a respective belt span 11b, 11a of the belt 11. The belt spans 11a and 11b engaged by the pulleys 46, 48 are those that are on either side of the MGU pulley 950. The tensioner 10 operates on those spans 11a and 11b to ensure that belt tension is maintained in the belt spans 11a and 11b regardless of whether the MGU 916 is being operated as a motive device to drive the belt 11 (in which case the tension in belt span 11b will be relatively high and the belt tension in belt span 11a will be relatively low), or whether the belt 11 is being driven by the engine 13 and the MGU 916 is either off or is acting as a generator.

Figure 5:
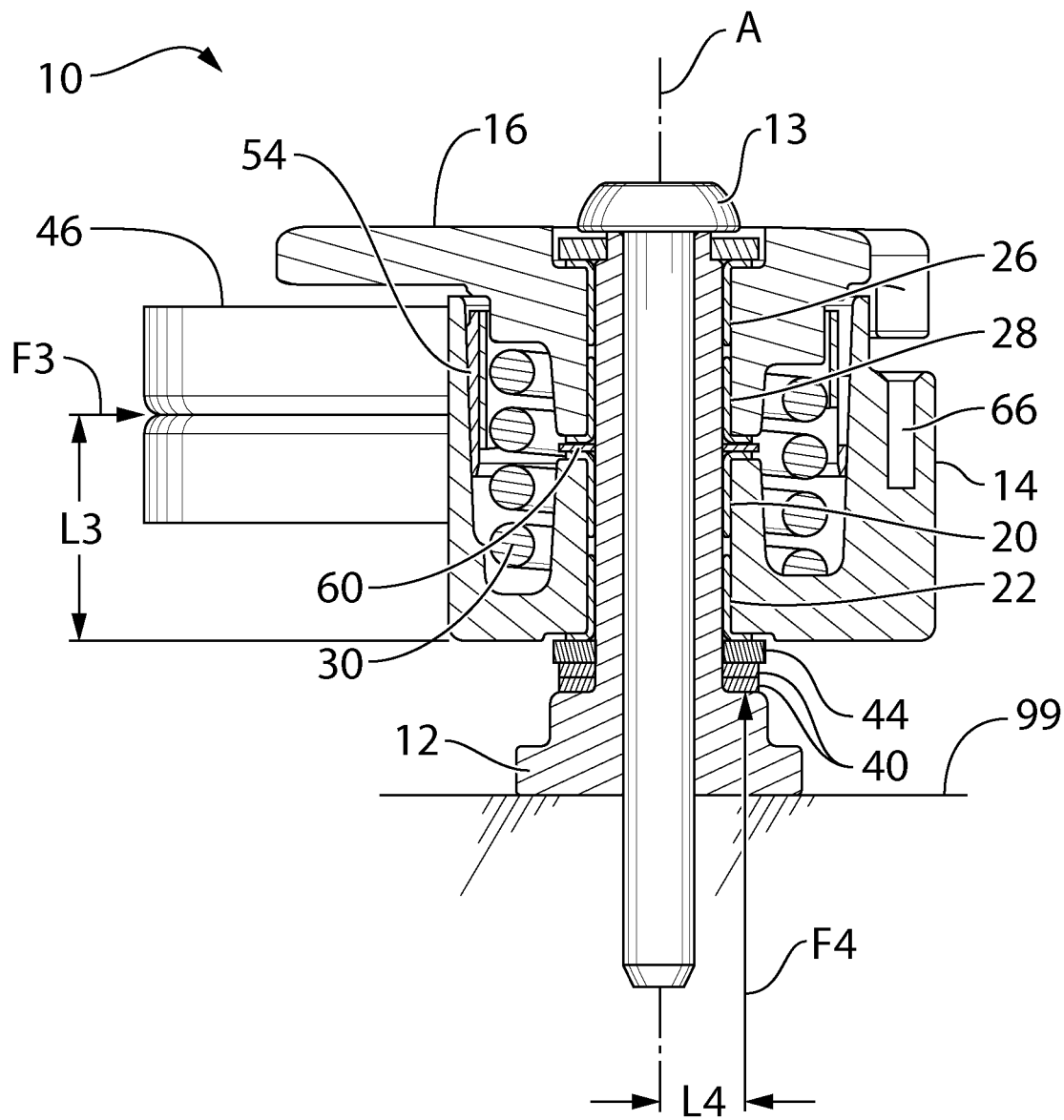
FIG. 5 is another sectional side view of the tensioner shown in FIG. 1 illustrating forces acting on the first tensioner arm.

Referring to FIG. 4, one or more (in this instance, two) axial preload members 40 are positioned on a shoulder 42 on the base 12, and are positioned to apply an axial biasing force on the lower tensioner arm 14, which may be referred to as an axial preload. The axial preload members 40 may be any suitable type of biasing members such as, for example, Belleville washers, which can generate large biasing forces and which are compact. The axial preload members 40 do not directly engage the arm 14; instead, a support member (e.g. a metallic disc) 44 is provided between the biasing members and the arm 14. Furthermore, the bushing 22 has a flange portion 46 that is also present between the axial preload members 40 and the arm 14, to prevent direct sliding movement between the arm 14 and the support member 44. The axial preload may be applied about the circumference of the lower arm 14, at an average radius r, as shown in FIG. 5. The function of the axial preload members 40 is described further below.

A damping structure 54 that includes a polymeric (e.g. unfilled (non-reinforced) nylon) tensioner arm damping member 56 and a metallic (e.g. steel) sleeve 58 that holds the damping member 56 and protects the damping member 56 against damage from engagement with the torsion spring 30. The damping member 56 provides damping for the movement of the tensioner arm 16. The components of the tensioner arm assembly may be similar to the analogous components described in PCT publication no. WO2013/059929, the contents of which are incorporated herein in their entirety. As the torsion spring 30 expands, during movement of the tensioner arms 14 and 16 as a result of an overall increase in belt tension in the two belt spans 11a and 11b, the damping member 56 is driven against the inside wall of a cup portion 59 of the lower tensioner arm 14.

A slide disc shown at 60 is provided between a flange portion of the upper bushing 20 and a flange portion of the lower bushing 28, so as to support the rotation of the two tensioner arms 14 and 16 relative to one another. A front disc 62 is provided between the head of the fastener 13 and a flange portion of the upper bushing 26.

Referring to FIG. 5, during operation, the belt 11 (FIG. 2) applies a hub load shown at F3 to the first pulley 46, which results in a force on the first arm 14. This hub load F3 introduces a tipping force to the lower arm 14 that, if unaddressed can result in yaw in the lower arm 14. This can, in turn, result in noise and wear problems with the belt 11, and can furthermore cause uneven wear in the bushings 20 and 22. The uneven wear in the bushings 20 and 22 can lead to progressively increasing play between the arm 14 and the base 12 and over time, premature failure of the tensioner 10. To counteract the tipping force caused by the hub load F3, the axial preload members 40 are selected to apply a sufficiently high axial preload (shown at F4 in FIG. 5) to the first arm 14 that a resulting radially directed counterforce applied to the bushings 20 and 22 from the axial preload is at least approximately as great as the bushing hub load applied to the bushings 20 and 22 as a result of the hub load F3. Because the axial preload F4 is applied about the entire circumference of the arm 14, the axial preload F4 is always positioned to counteract the bushing hub load that results from the pulley hub load F3.

In an example, the hub load F3 on the pulley 46 when the first tensioner arm 14 is at a particular position may be 395N. The bushing hub load that results from the pulley hub load F3 is determined as follows: BHL=F3×L3/BL, where BHL is the bushing hub load, F3 is the pulley hub load, L3 is the axial distance from the pulley hub load to the bottom of the bushings 20 and 22, and BL is the axial length of the bushings 20 and 22. In this example, F3=395N, L3=34.6 mm and BL=22 mm. BHL in this example can be calculated to be 621N.

The counterforce applied to the bushings 20 and 22 that are the result of the axial preload members 40 is determined as follows: CF=F4×L4/(BL/2), wherein CF is the counterforce, F4 is the axial preload, and L4 is the radius r of the axial preload. In a case where the axial preload members are selected to apply an axial preload F4=1000N at a radius r of 14.5 mm, the resultant counterforce is 1318N. Because the counterforce exceeds the bushing hub load, no moment is introduced that causes uneven wear to the bushings 20 and 22. As a result, the bushings 20 and 22 wear evenly, which can result in a longer life for the tensioner 10. It will be noted that, while an example was described with the arm 14 at a particular position, the counterforce generated by the axial preload members 40 may be sufficiently high so that it is at least approximately as great as the bushing hub load throughout a range of positions of the tensioner arm 14 and preferably throughout substantially all of the positions that the arm 14 will move to during operation within the design conditions of the engine 13 (FIG. 1).

Figure 6:
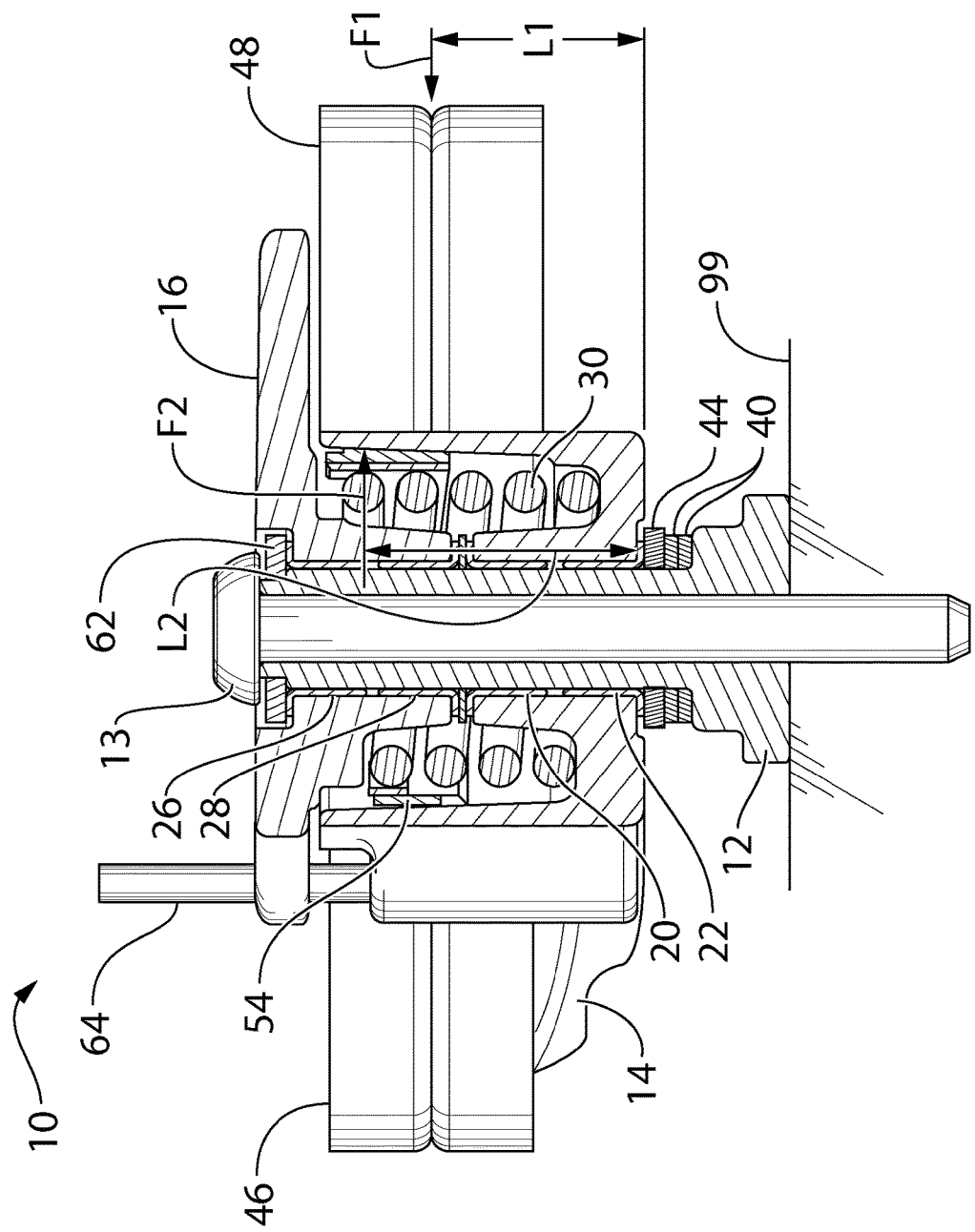
FIG. 6 is another sectional side view of the tensioner shown in FIG. 1 illustrating forces acting on the second tensioner arm.

The mechanics of the upper tensioner arm 16 will now be described. The pulley hub load is shown at F1 and is in this example, 486N. The second end 34 of the spring 30 applies a force F2 on the tensioner arm 16. The second end 34 of the spring 30 may be oriented so that the force F2 is generally in the same direction as the force F1 (i.e. the forces are additive). These forces are resisted by a reaction force through the bushings 26 and 28. The centroid of the reaction force (LFR) may be determined by the formula: LFR=((F1×L1)+(F2×L2))/(F1+F2), where L1 is the moment arm of the force F1, and L2 is the moment arm of the force F2. In an example, F1 may be 486N at a moment arm L1 of 34.6 mm to a reference line. F2 is 866N at a moment arm of 41.4 mm. In this example, LFR=39 mm, which as can be seen in FIG. 6, is close to the center of the bushings 26 and 28, which is at 35.5 mm from the reference line. Thus, the upper bushings 26 and 28, or the upper arm 16 overall, may be said to be in balance. This arrangement in relation to the upper arm 16 may be as described in PCT publication no WO2010/037232, the contents of which are incorporated herein by reference in their entirety. Providing a reaction force that is approximately centered axially on the bushings results in more even wear and a resulting longer life for the bushings 26 and 28.

As explained above, there is a force F2 that is shown to be exerted by the second end 36 of the spring 30 on the upper tensioner arm 16 in the diagram shown in FIG. 6. However, as can be seen in FIG. 5, there is no analogous force shown to be exerted by the first end 32 of the spring 30 on the lower tensioner arm 14. A reason there is no analogous force shown for the lower tensioner arm 14 is that the forces exerted by the spring 30 on the lower arm 14 essentially cancel out. More specifically, the coils (shown at 61) of the tensioner arm biasing member 30 expand radially proportionately to a tensioning force applied by the first and second ends 32 and 36 to the first and second tensioner arms 14 and 16. The damping structure 54 is driven to apply a frictional damping force to the first tensioner arm 14 (by engagement with the cup portion 59 of the first tensioner arm 14) that is proportional to an amount of radial expansion of the tensioner arm biasing member 30. As a result of this arrangement the tensioning force exerted by the first end 32 of the spring 30 on the lower arm 14 is substantially cancelled by a force exerted through the damping structure 54 on the cup portion 59 of the lower arm 14 from expansion of the upper coils 61 of the spring 30.

It will be noted that, while an example was described with the arm 16 at one particular position, the reaction force generated at the second bushing arrangement may be approximately centered axially along the second bushing arrangement throughout a range of positions of the tensioner arm 16.

Thus by providing both of the features described above in relation to increasing the operating life of the bushings 20 and 22, and 26 and 28, the operating life of the tensioner 10 may be longer than that of other V tensioners of the prior art.

For greater certainty, it will be noted that the benefits described above for the bushings 20 and 22, and for the bushings 26 and 28 would be applicable to first and second bushing arrangements that each only included a single bushing.

It will be noted that, in FIGS. 4 and 5, the lengths of the arrows representing forces F1, F2, F3 and F4 are not to be taken as being indicative of the magnitudes of the forces being represented.

An installation pin 64 may be provided which is insertable and removable from apertures 66 and 68 in the first and second tensioner arms 14 and 16 to hold the arms 14 and 16 in a certain position to facilitate installation of the belt 11. Once the belt 11 is installed, the installation pin (or more generally an arm locking member) can be removed, permitting the arms 14 and 16 to engage respective spans of the belt 11.

Reference is made to FIGS. 7-14 which show the tensioner 10 with several different arrangements of damping structures. Small differences may be present in certain elements of the tensioner 10 in each of these figures, which are explained. In FIGS. 7-13, it will be noted that the tensioner does not include the damping structure 54 that is present in the tensioner 10 in FIGS. 1-6.

Figure 7:
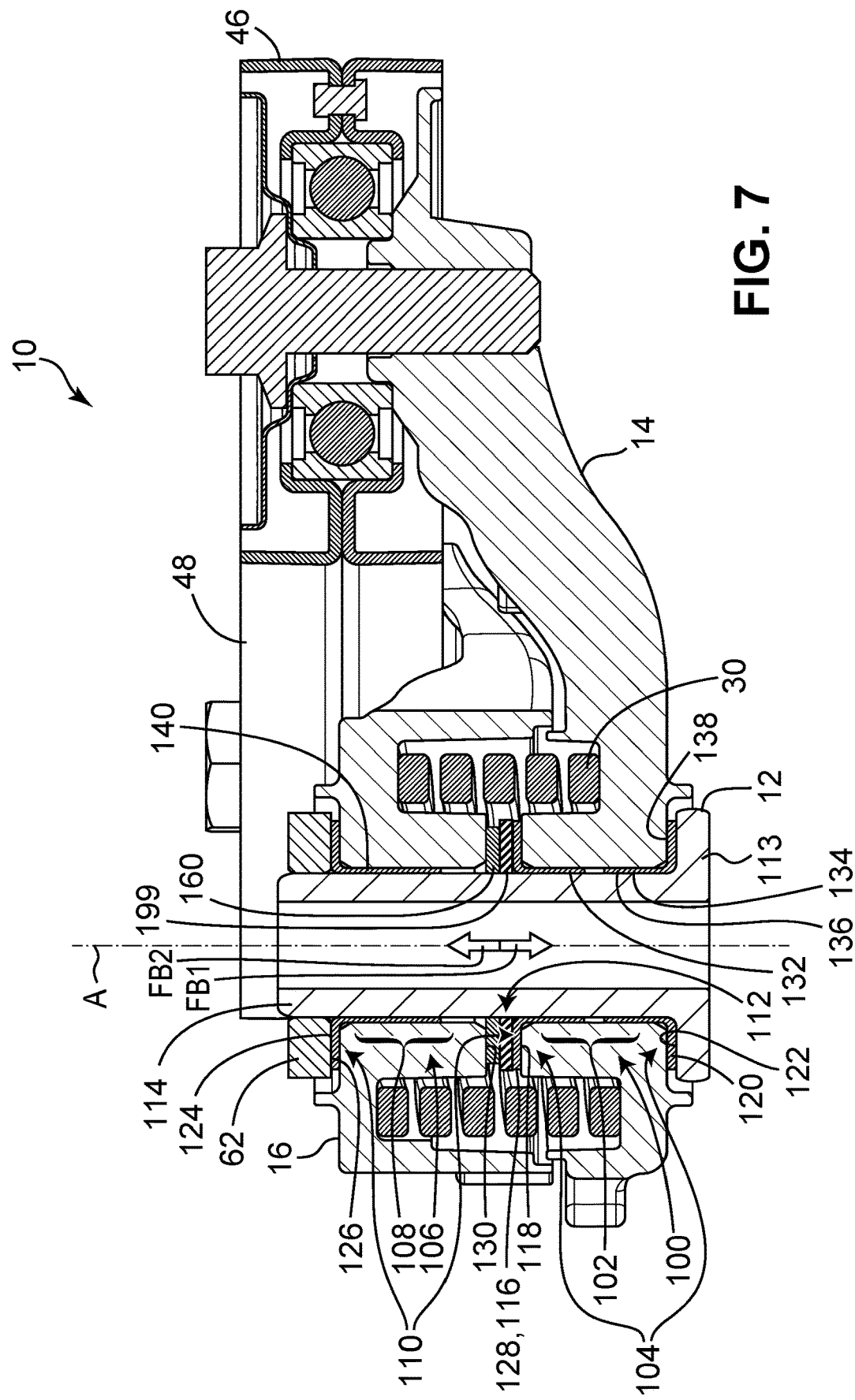
FIG. 7 is a sectional side view of the tensioner shown in FIG. 1, with an alternative damping arrangement, according to another embodiment of the present disclosure.

FIG. 7 shows a sectional view of the tensioner 10 including a first tensioner arm damping arrangement 100 including a first radial damping portion 102 positioned radially between the first tensioner arm 14 and the base 12, and a first axial damping portion 104. The first radial damping portion 102 and the first axial damping portion 104 cooperate to provide damping to movement of the first tensioner arm 14. The tensioner 10 in FIG. 7 further includes a second tensioner arm damping arrangement 106 including a second radial damping portion 108 positioned radially between the second tensioner arm 16 and the base 12 and a second axial damping portion 110. The second radial damping portion 108 and the second axial damping portion 110 cooperate to provide damping to movement of the second tensioner arm 16. The tensioner 10 in FIG. 7 further includes a damping system biasing member 112 that is engaged between the first and second tensioner arms 14 and 16 and that exerts first and second damping system biasing forces (shown at FB1 and FB2) on the first and second axial damping portions 104 and 110 respectively. The first and second damping system biasing forces FB1 and FB2 are directed in axially opposite directions from one another. The forces FB1 and FB2 are shown in FIG. 7 as being directly along axis A, however this is simply their representation as point forces. It will be noted that the force FB1 is a distributed force that is symmetrically positioned all the way around the axis A and oriented axially, in a proximal direction (i.e. towards the proximal end of the base 12). Thus, the force FB1 and the force FB2 are balanced evenly about the axis A inhibiting any lean on the tensioner arms 14 and 16. In contrast to this, some tensioners of the prior art provide damping that is imbalanced, thereby promoting a lean on one or both tensioner arms, which can, over time result in failure of the tensioner 10. For the purposes of FIGS. 7-14, the proximal end of the base 12 (shown at 113) is the end of the base 12 that is engaged with the stationary member 99 when the tensioner 10 is installed. Analogously, the base 12 has a distal end 114 that is the end that is opposite to the proximal end 113. In the embodiments shown, the first tensioner arm 14 is the arm that is proximally positioned and the second tensioner arm 16 is the arm that is distally positioned.

In the embodiments shown, the first axial damping portion 104 includes a distal portion 116 that cooperates with a distal surface 118 on the first tensioner arm 14 to dampen movement thereof, and a first proximal portion 120 that cooperates with a proximal surface 122 on the first tensioner arm 14 to dampen movement thereof. Similarly, the second axial damping portion 110 includes a distal portion 124 that cooperates with a distal surface 126 on the second tensioner arm 16 to dampen movement thereof. The second axial damping portion 110 in FIG. 7 further includes a proximal portion 128 that cooperates with a proximal surface 130 on the second tensioner arm 16 to dampen movement thereof.

In the embodiment shown in FIG. 7, the first tensioner arm damping arrangement 100 is provided by a first distal tophat member 132 and a first proximal tophat member 134. Each of the first distal and first proximal tophat members 132 and 134 includes a cylinder 136 and a flange 138. The cylinder 136 surrounds the base 12. Examples of suitable tophat members are shown as the bushings 20, 22, 26 and 28 in FIGS. 3-6. The tophat members 132 and 134 may be made from any suitable material that provides suitable frictional damping properties during movement of the first tensioner arm 14. For example, the tophat members 132 and 134 may be made from stainless steel impregnated with PTFE.

The tophat members 132 and 134 may be fixed to the first tensioner arm 14 and may move relative to the base 12 when the arm 14 moves. Thus the frictional damping provided by the tophat members 132 and 134 may be relative to the base 12 or other members of the tensioner 10 (such as washer support disc 199, discussed further below). In the embodiment shown in FIG. 7, the cylinders 136 from each of the tophat members 132 and 134 together make up the first radial damping portion 102, and the flanges 138 from the two tophat members 132 and 134 together make up the first axial damping portion 110. The flange 138 of the first distal tophat member 132 makes up the distal portion 116 of the first axial damping portion 110. The flange 138 of the first proximal tophat member 134 makes up the proximal portion 120 of the first axial damping portion 110.

In the embodiment shown in FIG. 7, the second tensioner arm damping arrangement 106 is provided by a second distal tophat member 140, and also by a distal facing portion of the flange 138 from the first distal tophat member 132. The second distal tophat member 140 may be similar to the tophat members 132 and 134. In the embodiment shown in FIG. 7, it can be seen therefore that the distal portion 116 of the first axial damping portion 104 is integral with the proximal portion 128 of the second axial damping portion 110. In other embodiments, however, such as the embodiment shown in FIG. 8, the distal portion 116 of the first axial damping portion 104 is provided on another tophat member shown at 180 and is therefore separate from the proximal portion 128 of the second axial damping portion 110. The tophat member 140 includes a cylinder 136 that surrounds the base 12, and a flange 138 which makes up the distal portion 124 of the second axial damping portion 110.

Figure 8:
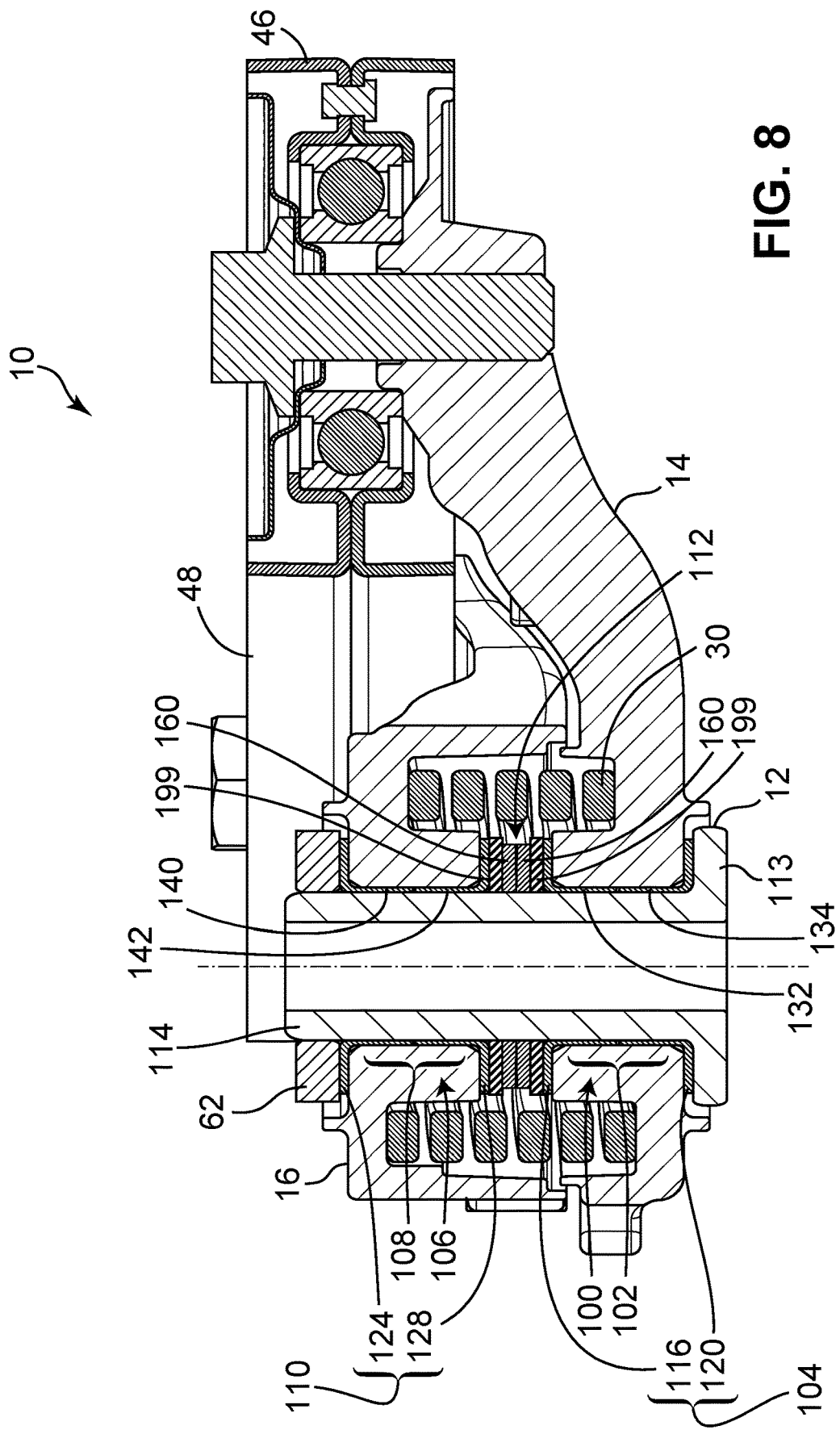
FIG. 8 is a sectional side view of the tensioner shown in FIG. 1, with another alternative damping arrangement, according to another embodiment of the present disclosure.

In FIG. 8, as noted above, the second tensioner arm damping arrangement 106 includes a second proximal tophat member 142 which may be similar to the tophat members 132 and 134 and may therefore include a cylinder 136 that surrounds the base 12, and a flange 138. The flange 138 of the tophat member 142 in FIG. 8 makes up the proximal portion 128 of the second axial damping portion 110.

Figure 11:
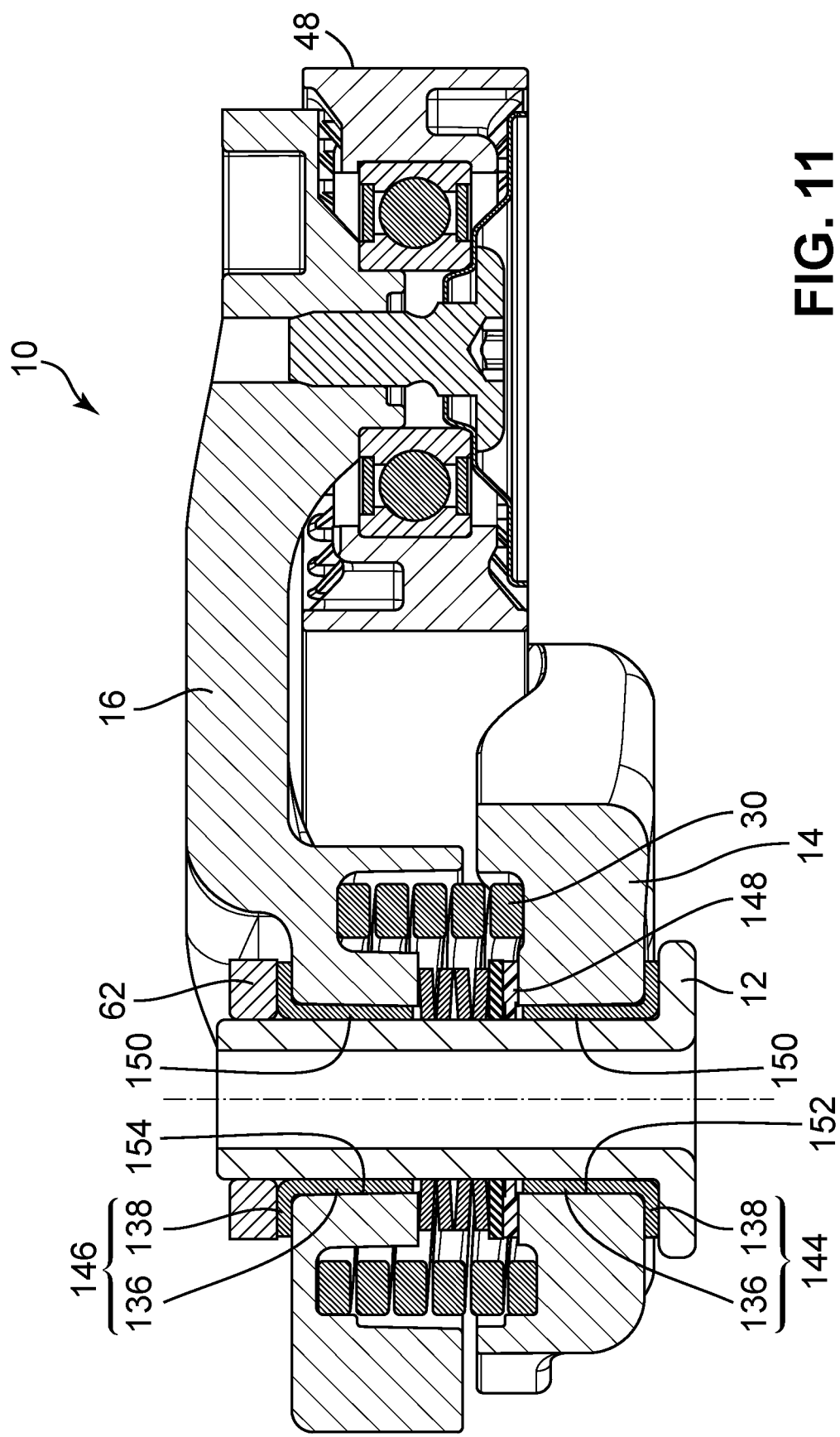
FIG. 11 is a sectional side view of the tensioner shown in FIG. 1, with yet another alternative damping arrangement, according to another embodiment of the present disclosure.

Reference is made to FIG. 11. In the embodiment shown in FIG. 11, the first tensioner arm damping arrangement 100 and the second tensioner arm damping arrangement 106 together include a first arm tophat member 144, a second arm tophat member 146, and a damping disc 148. The first and second arm tophat members 144 and 146 may be similar to the tophat members 132 and 134 in the sense that each tophat member 144 and 146 includes a cylinder 136 that surrounds the base 12, and a flange 138. The flange 138 of the first arm tophat member 144 cooperates with the proximal surface 122 on the first tensioner arm 14 to dampen movement thereof. The flange 138 of the second arm tophat member 146 cooperates with a distal surface 126 on the second tensioner arm 16 to dampen movement thereof. The damping disc 148 is positioned to cooperate with the distal surface 118 on the first tensioner arm 14 and a proximal surface 130 on the second tensioner arm 16 to dampen movement of either of the first and second tensioner arms 14 and 16 relative to the other of the first and second tensioner arms 14 and 16.

In the embodiment shown in FIG. 11, the cylinder 136 of each of the first and second arm tophat members 144 and 146 has a radially outer surface 150 that is tapered (i.e. that has a diameter that increases towards the flange 138). Correspondingly, the inner faces of the tensioner arms 14 and 16 (shown at 152 and 154 respectively) are also tapered so as to mate with the outer surface 150 of the cylinder 136. By having tapered inner surfaces 152 and 154 on the tensioner arms 14 and 16, the tensioner arms may be more easily formed by a metal molding process such as casting. This can assist in reducing the cost of manufacture of the tensioner arms 14 and 16.

Figure 12:
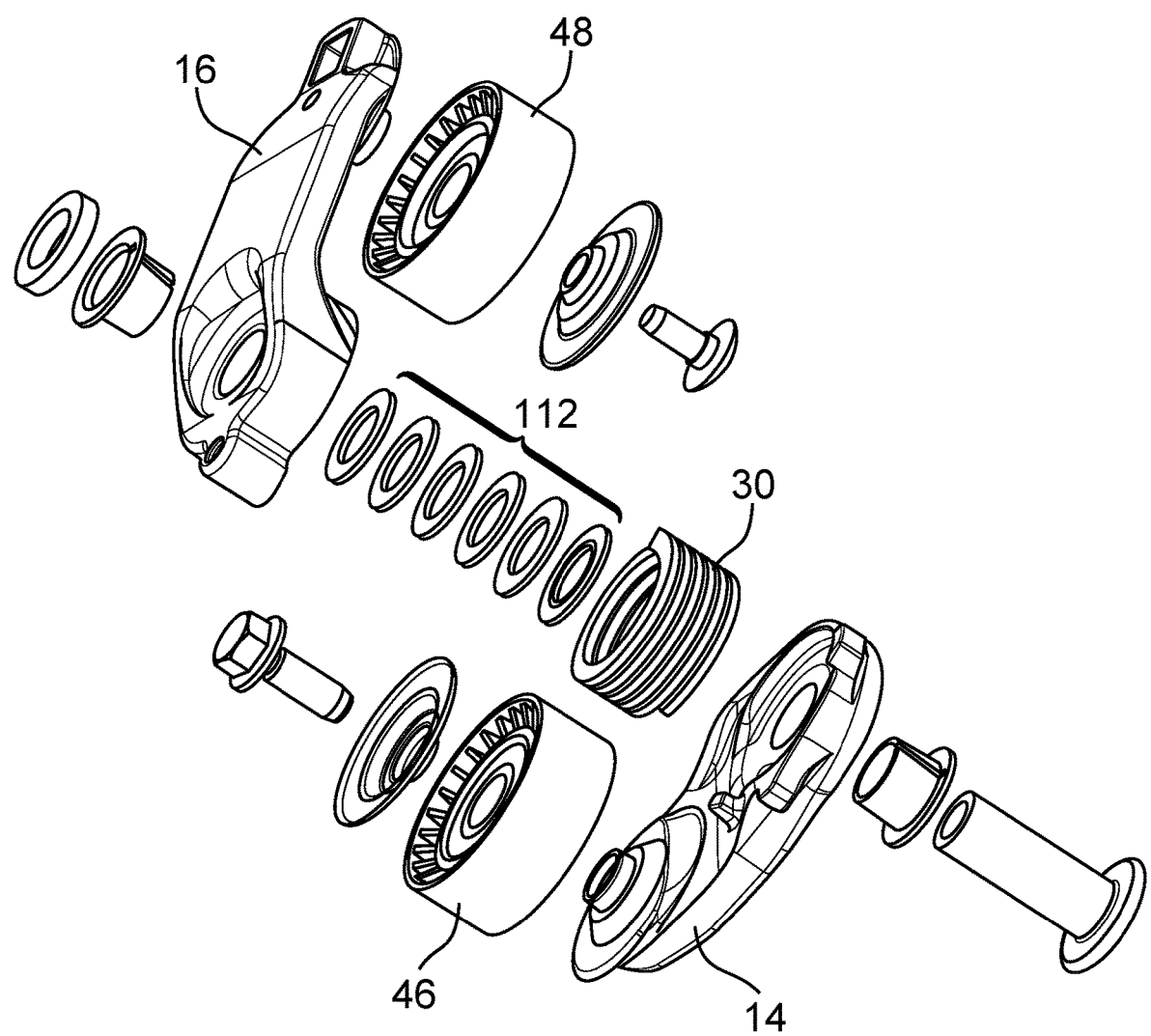
FIG. 12 is an exploded perspective view of the tensioner shown in FIG. 11.
Figure 13:
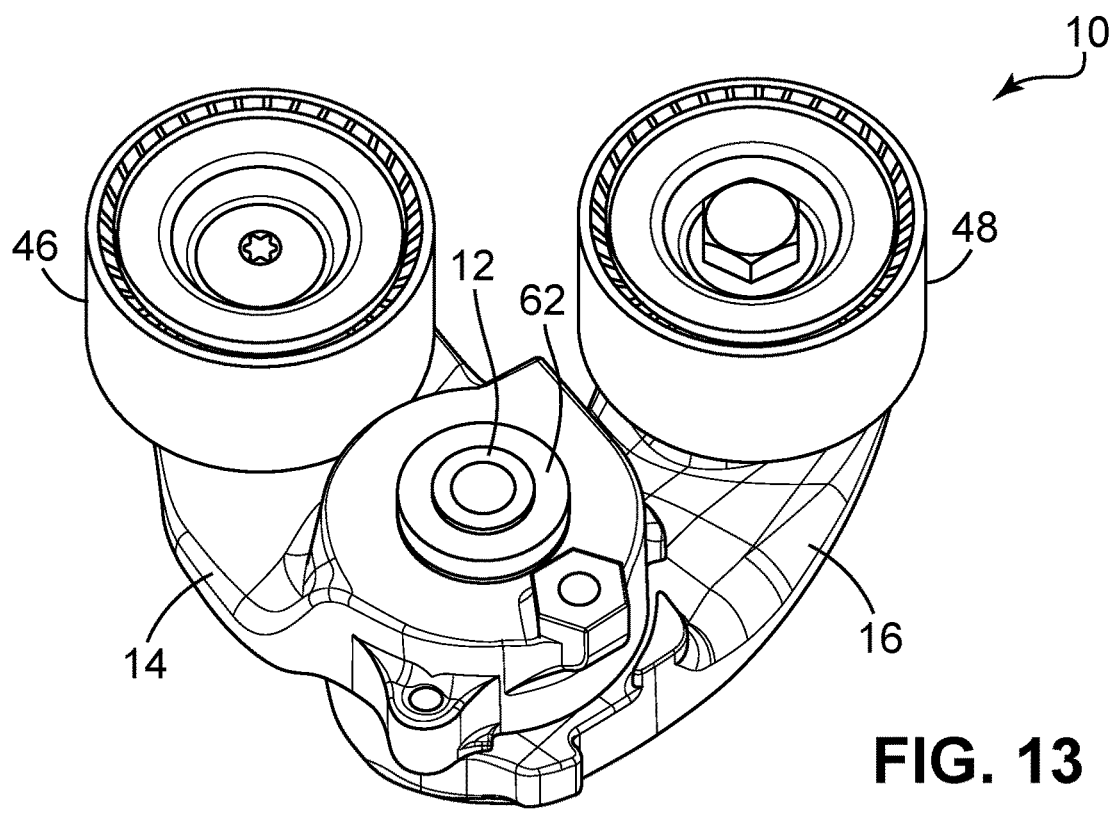
FIGS. 13 and 14 are perspective views of two variants of the tensioner as shown in any of FIGS. 7-12.
Figure 14:
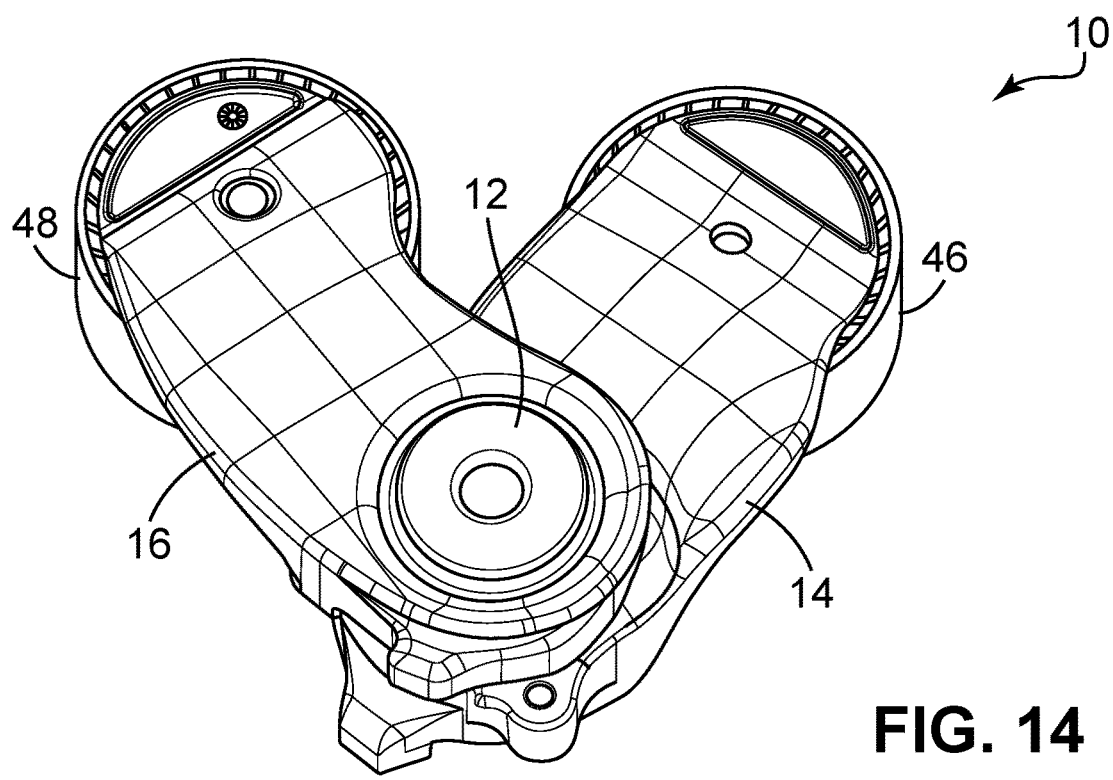

FIG. 12 is an exploded view of the tensioner 10 shown in FIG. 11.

As can be seen, the damping system biasing member 112 shown in FIGS. 7-12 includes at least one spring washer 160 (e.g. at least one Belleville washer) that is positioned to move (i.e. to pivot) with one of the first and second tensioner arms 14 and 16, and least one support disc 199 that is positioned to move with said one of the first and second tensioner arms 14 and 16, and which is positioned between the at least one spring washer 160 and whichever of the first and second axial damping portions 104 and 110 is associated with the other of the first and second tensioner arms 14 and 16. In the examples shown in FIGS. 7-12, the spring washer(s) 160 and the support disc 199 move (i.e. pivot) with the second tensioner arm 16 and the support disc 199 is positioned between the spring washer(s) 160 and the first axial damping portion 104 on the first tensioner arm 14. This means that there is frictional engagement between the support disc 199 and whatever damping surface is adjacent to it (e.g. the flange 138 on the first distal tophat 132 as shown in FIG. 7).

The number of spring washers 160 used may be selected based on the amount of damping force that will be provided for the particular engine.

The support disc 199 may be made from a metallic material so as to inihibit gouging by the spring washer(s) 160 applying force on it.

It will be understood that other types of damping system biasing members could alternatively be used.

Figure 9:
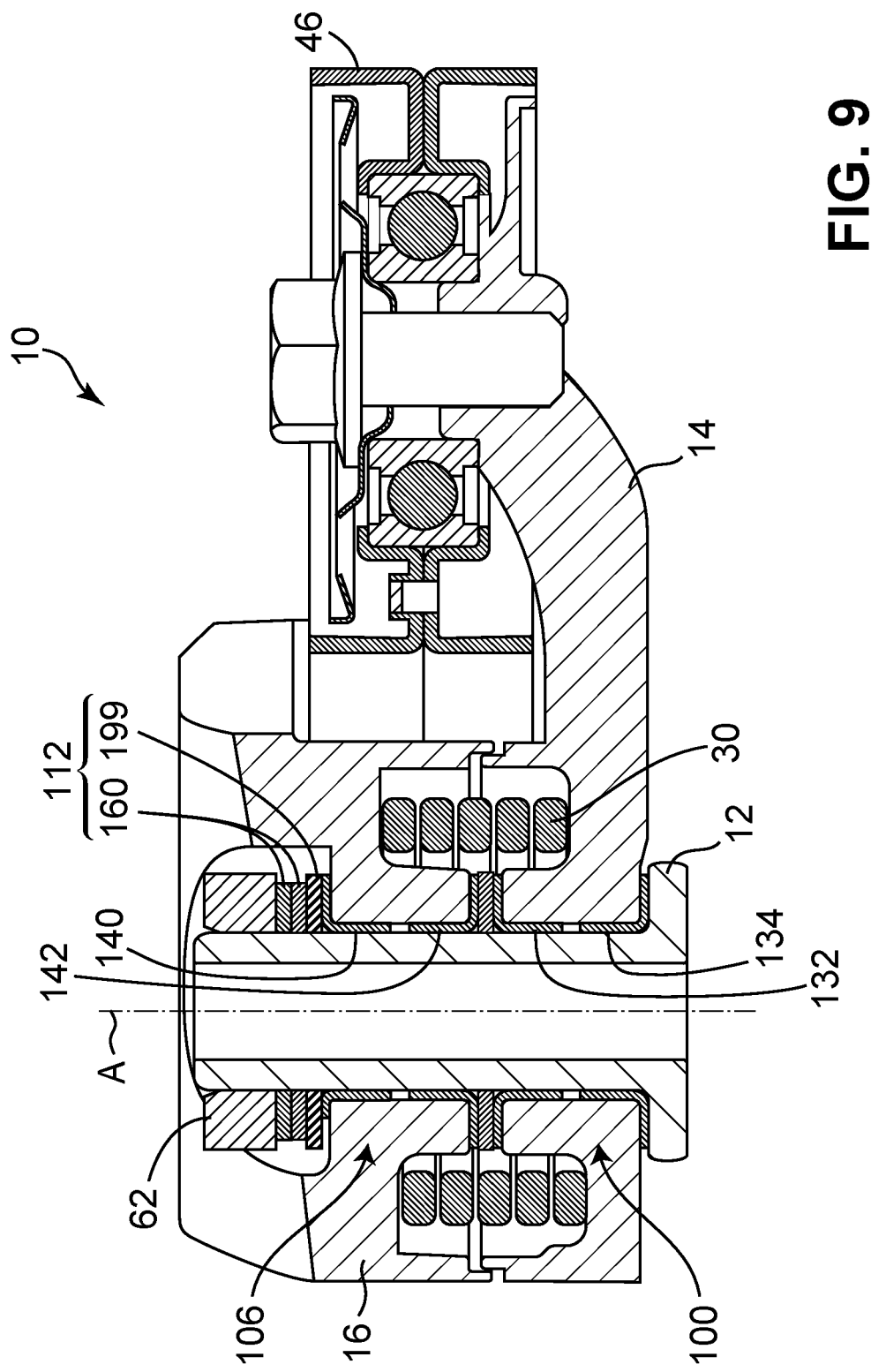
FIG. 9 is a sectional side view of the tensioner shown in FIG. 1, with yet another alternative damping arrangement, according to another embodiment of the present disclosure.
Figure 10:
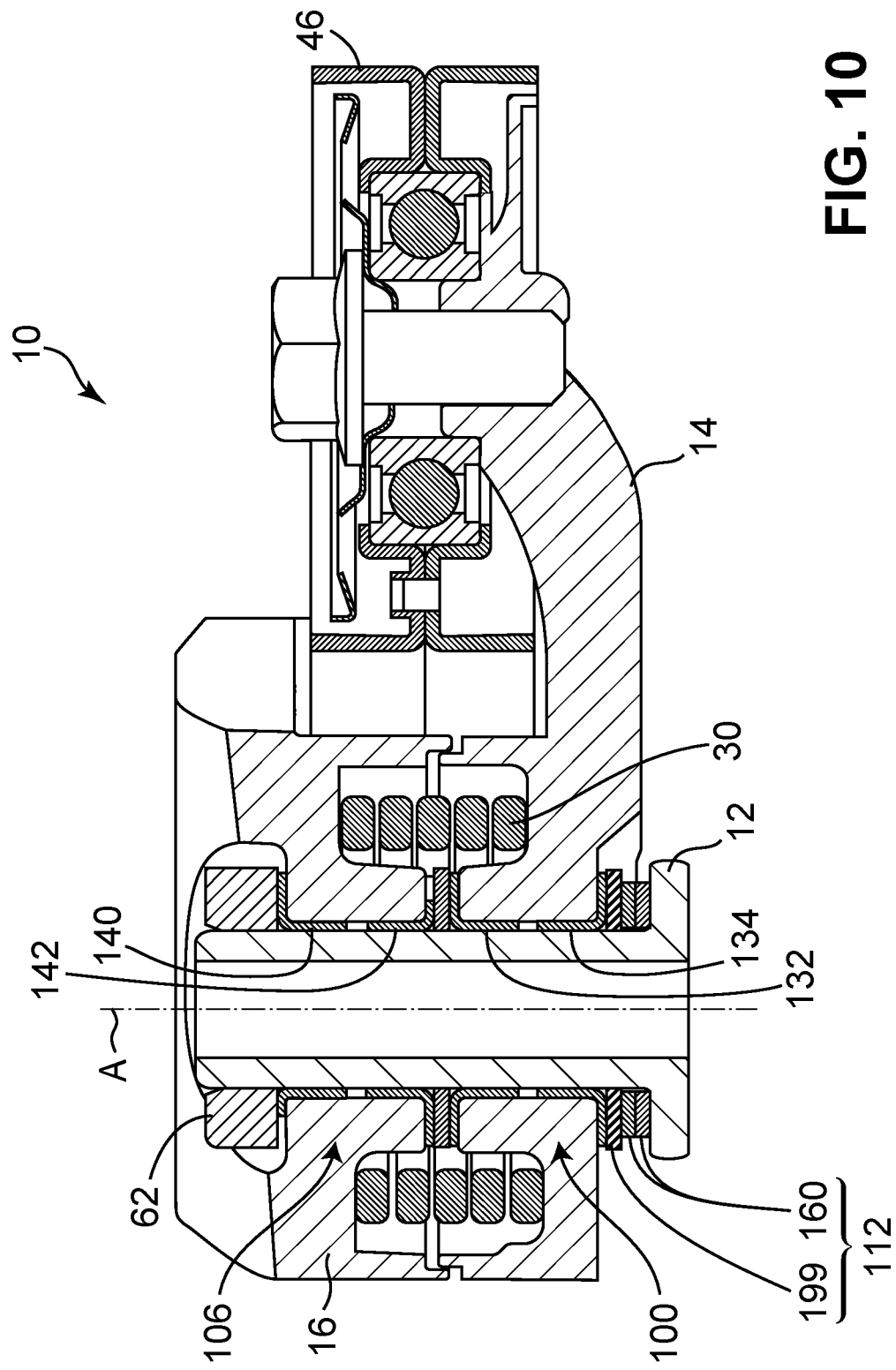
FIG. 10 is a sectional side view of the tensioner shown in FIG. 1, with yet another alternative damping arrangement, according to another embodiment of the present disclosure.

FIG. 10 shows the tensioner 10 with a proximal and a distal tophat member on each tensioner arm 14 and 16, and with the damping system biasing member 112 positioned proximal relative to the first and second tensioner arms 14 and 16. FIG. 9, on the other hand, shows the tensioner 10 with a proximal and a distal tophat member on each tensioner arm 14 and 16, and with the damping system biasing member 112 positioned distal relative to the first and second tensioner arms 14 and 16. It will be noted that, in embodiments in which the biasing member 112 is positioned proximal to the arms 14 and 16 or distal to the arms 14 and 16, another support disc 199 may be provided between the tophat member that is distal to the first arm 14 and the tophat member that is proximal to the second arm 16.

It will further be noted that it may be advantageous to provide a tensioner with three tophat members (e.g. similar to the embodiment shown in FIG. 7) but without regard to the location of the biasing member 112 (in other words, with the biasing member 112 distal to the first and second arms 14 and 16, or with the biasing member 112 proximal to the first and second arms 14 and 16). In embodiments in which three tophat members are provided the tophat shown at 132 (FIG. 7) may be considered to be an intermediate tophat member, wherein the flange 138 of the intermediate tophat member 132 is positioned to cooperate with a distal surface 118 on the first tensioner arm 14 and a proximal surface 130 on the second tensioner arm 16 to dampen movement of either of the first and second tensioner arms 14 and 16 relative to the other of the first and second tensioner arms 14 and 16. The tophat member 134 may be referred in such embodiments as a first arm tophat member and the tophat member 140 may be referred as a second arm tophat member. While the intermediate tophat member 132 is shown as having its cylinder directed proximally so as to engage and support the first tensioner arm 14, it is alternatively possible for the intermediate tophat member 132 to be oriented such that its cylinder 136 is directed distally and supports the second tensioner arm 16 and with its flange 138 in direct engagement with the proximal surface 130 of the second tensioner arm 16. In such a case, the biasing member 112 would be positioned proximal to the flange 138 and would move with the first tensioner arm 14.

The arms 14 and 16 may have any suitable configuration. For example, the arm 14 may have its pulley 46 arranged distally on the arm 14, while the arm 16 may have its pulley arranged proximally on the arm 16. By contrast, in the embodiment shown in FIG. 13, the pulleys 46 and 48 on both arms 14 and 16 are arranged distally. In the example shown in FIG. 14, the pulleys 46 and 48 are arranged proximally on the arms 14 and 16.

Those skilled in the art will appreciate that a variety of modifications may be made to the embodiments described herein without departing from the fair meaning of the accompanying claims.

What is claimed is:

1. A tensioner for an endless drive member, comprising:
a base having a proximal end and a distal end and is mountable at the proximal end to a stationary structure;
a first tensioner arm that is pivotable relative to the base about a common axis;
a first tensioner pulley that is mounted for rotation on the first tensioner arm about a first pulley axis that is spaced from the common axis;
a second tensioner arm that is pivotable relative to the base about the common axis;
a second tensioner pulley that is mounted for rotation on the second tensioner arm about a second pulley axis that is spaced from the common axis and spaced from the first pulley axis;
a tensioner biasing member that is engaged between the first and second tensioner arms to urge the first and second tensioner pulleys towards each other;
a first tensioner arm damping arrangement including a first radial damping portion positioned radially between the first tensioner arm and the base, and a first axial damping portion, wherein the first radial damping portion and the first axial damping portion cooperate to provide damping to movement of the first tensioner arm;
a second tensioner arm damping arrangement including a second radial damping portion positioned radially between the second tensioner arm and the base and a second axial damping portion, wherein the second radial damping portion and the second axial damping portion cooperate to provide damping to movement of the second tensioner arm;
a damping system biasing member that is engaged between the first and second tensioner arms and that exerts first and second damping system biasing forces on the first and second axial damping portions respectively, wherein the first and second damping system biasing forces are directed in axially opposite directions from one another.

2. A tensioner as claimed in claim 1, wherein the first axial damping portion includes a distal portion that cooperates with a distal surface on the first tensioner arm to dampen movement thereof, and a first proximal portion that cooperates with a proximal surface on the first tensioner arm to dampen movement thereof.

3. A tensioner as claimed in claim 2, wherein the second axial damping portion includes a distal portion that cooperates with a distal surface on the second tensioner arm to dampen movement thereof.

4. A tensioner as claimed in claim 3, wherein the second axial damping portion further includes a proximal portion that cooperates with a proximal surface on the second tensioner arm to dampen movement thereof.

5. A tensioner as claimed in claim 4, wherein the distal portion of the first axial damping portion is integral with the proximal portion of the second axial damping portion.

6. A tensioner as claimed in claim 4, wherein the distal portion of the first axial damping portion is separate from the proximal portion of the second axial damping portion.

7. A tensioner as claimed in claim 2, wherein the first tensioner arm damping arrangement includes a first distal tophat member and a first proximal tophat member, wherein each of the first distal and first proximal tophat members includes a cylinder that surrounds the base, and a flange, wherein the flange of the first distal tophat member makes up the distal portion of the first axial damping portion, and wherein the flange of the first proximal tophat member makes up the proximal portion of the first axial damping portion.

8. A tensioner as claimed in claim 7, wherein the second axial damping portion includes a distal portion that cooperates with a distal surface on the second tensioner arm to dampen movement thereof, and
wherein the second tensioner arm damping arrangement includes a second distal tophat member, wherein the second distal tophat member includes a cylinder that surrounds the base, and a flange, wherein the flange of the second distal tophat member makes up the distal portion of the second axial damping portion.

9. A tensioner as claimed in claim 8, wherein the second axial damping portion further includes a proximal portion that cooperates with a proximal surface on the second tensioner arm to dampen movement thereof, and
wherein the second tensioner arm damping arrangement includes a second proximal tophat member, wherein the second proximal tophat member includes a cylinder that surrounds the base, and a flange, wherein the flange of the second proximal tophat member makes up the proximal portion of the second axial damping portion.

10. A tensioner as claimed in claim 1, wherein the first tensioner arm damping arrangement and the second tensioner arm damping arrangement together include a first arm tophat member, a second arm tophat member, and a damping disc, wherein the first and second arm tophat members each include a cylinder that surrounds the base, and a flange,
wherein the flange of the first arm tophat member cooperates with a proximal surface on the first tensioner arm to dampen movement thereof, and wherein the flange of the second arm tophat member cooperates with a distal surface on the second tensioner arm to dampen movement thereof,
wherein the damping disc is positioned to cooperate with a distal surface on the first tensioner arm and a proximal surface on the second tensioner arm to dampen movement of either of the first and second tensioner arms relative to the other of the first and second tensioner arms.

11. A tensioner as claimed in claim 10, wherein the cylinder on each of the first and second arm tophat members has a radially outer surface that is tapered.

12. A tensioner as claimed in claim 1, wherein the damping system biasing member includes at least one spring washer that is positioned to move with one of the first and second tensioner arms, and least one support disc that is positioned to move with said one of the first and second tensioner arms, and that is positioned between the at least one spring washer and whichever of the first and second axial damping portions is associated with the other of the first and second tensioner arms.

13. A tensioner for an endless drive member, comprising:
a base having a proximal end and a distal end and is mountable at the proximal end to a stationary structure;
a first tensioner arm that is pivotable relative to the base about a common axis;

a first tensioner pulley that is mounted for rotation on the first tensioner arm about a first pulley axis that is spaced from the common axis;

a second tensioner arm that is pivotable relative to the base about the common axis;

a second tensioner pulley that is mounted for rotation on the second tensioner arm about a second pulley axis that is spaced from the common axis and spaced from the first pulley axis;

a tensioner biasing member that is engaged between the first and second tensioner arms to urge the first and second tensioner pulleys towards each other;

a first tensioner arm damping arrangement including a first radial damping portion positioned radially between the first tensioner arm and the base, and a first axial damping portion, wherein the first radial damping portion and the first axial damping portion cooperate to provide damping to movement of the first tensioner arm;

a second tensioner arm damping arrangement including a second radial damping portion positioned radially between the second tensioner arm and the base and a second axial damping portion, wherein the second radial damping portion and the second axial damping portion cooperate to provide damping to movement of the second tensioner arm; and a damping system biasing member that is positioned to apply an axial biasing force to the first and second axial damping portions to generate friction thereat;

wherein the first tensioner arm damping arrangement and the second tensioner arm damping arrangement together include a first arm tophat member, a second arm tophat member, and an intermediate tophat member, wherein the first arm tophat member, the second arm tophat member and the intermediate tophat member each include a cylinder that surrounds the base, and a flange, wherein the flange of the first arm tophat member cooperates with a proximal surface on the first tensioner arm to dampen movement thereof, and wherein the flange of the second arm tophat member cooperates with a distal surface on the second tensioner arm to dampen movement thereof, wherein the flange of the intermediate tophat member is positioned to cooperate with a distal surface on the first tensioner arm and a proximal surface on the second tensioner arm to dampen movement of either of the first and second tensioner arms relative to the other of the first and second tensioner arms.

* * * * *